INVENTOR
John M. Cochran

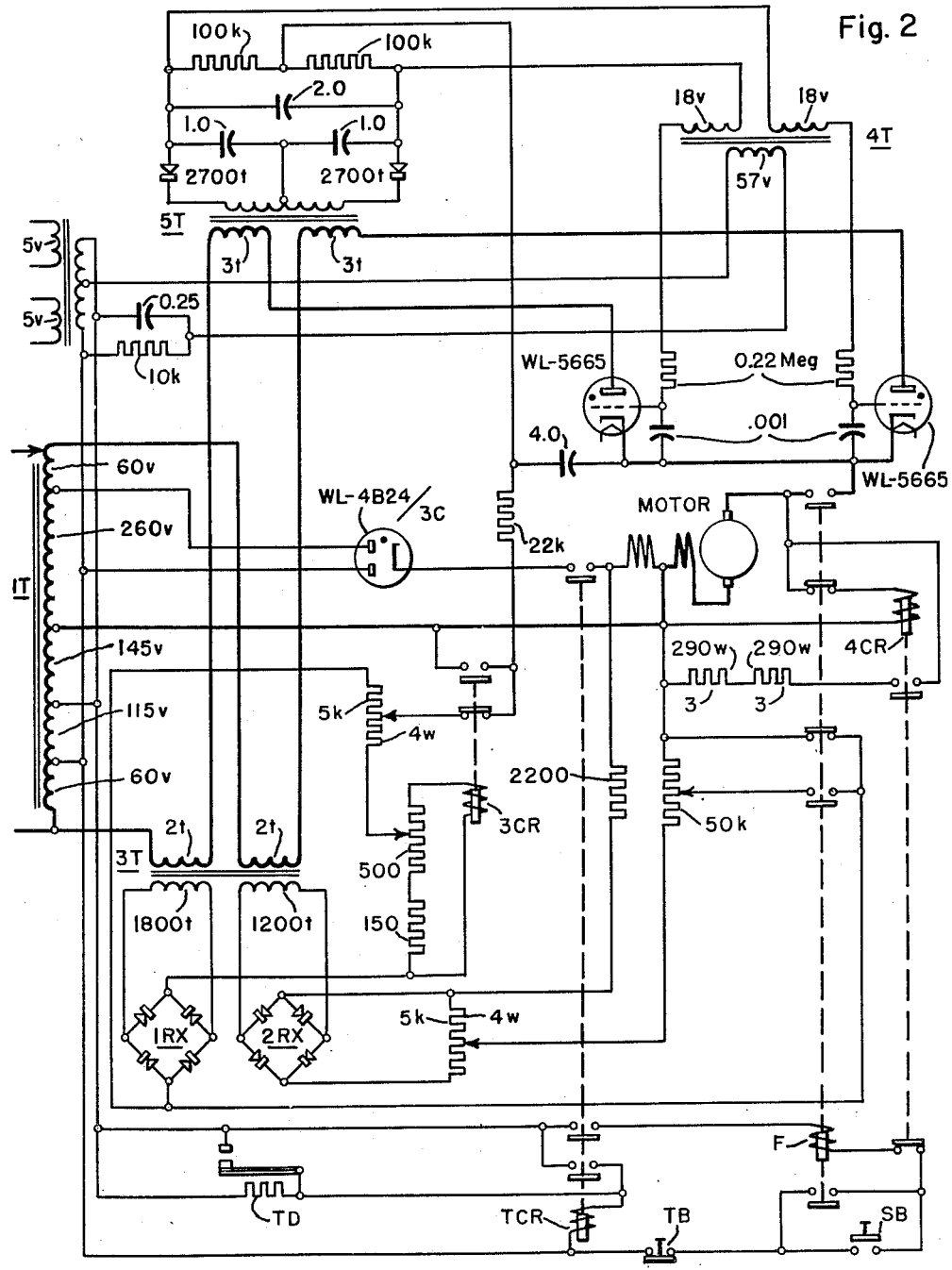

United States Patent Office

2,798,996
Patented July 9, 1957

2,798,996

ELECTRIC DISCHARGE APPARATUS FOR MOTOR CONTROL

John M. Cochran, Buffalo, N. Y., assignor to Westinghouse Electric Corporation, East Pittsburgh, Pa., a corporation of Pennsylvania Application September 22, 1955, Serial No. 535,959

6 Claims. (Cl. 318—308)

This invention relates to an electric discharge apparatus and has particular relation to electronic power rectifiers in which the load current is carried by grid controlled discharge devices. In its specific aspects, this invention concerns itself with electronic power rectifier apparatus for controlling the supply of current to direct current motors.

A typical motor control system includes a pair of thyratrons having a rating sufficient to supply the motor. The motor and the thyratrons are energized from an alternating current power supply having three conductors, one of which is at an intermediate potential and the thyratrons are connected in a full wave rectifier circuit between this supply and the armature of the motor. The motor is controlled by controlling the conduction of the thyratrons and the latter control is usually effected by rendering each of the thyratrons in its turn conducting at predetermined instants in alternate half periods of the supply. Since there may be, and frequently is, a delay between the time when one thyratron becomes nonconducting and the other thyratron becomes conducting, the armature is supplied with discontinuance current pulses.

In an apparatus of this type it is desirable that the thyratrons be balanced, that is, that the average current conducted by one thyratron averaged over a short time interval (1 cycle up to several seconds depending on the "averaging" time listed for the thyratron) be substantially equal to the average current similarly averaged conducted by the other at any time during the operation. One disadvantage of an unbalance between the current conducted by the thyratrons of a multi-thyratron rectifier is that it becomes necessary to operate the thyratrons at reduced rating so as to prevent the overloading of the thyratron which conducts the higher current. It may then become necessary to provide thyratrons of higher rating for a given service than the rating suitable for balanced thyratrons and this results in increased cost which is substantial because high rating thyratrons are costly. Unbalanced thyratrons in a motor control system also tend to reduce system efficiency, produce saturation to increase the heating of the anode transformer, cause distortion in the alternating current line, and increase the form factor, that is, the ratio of the root mean square current to average current. A further disadvantage of unbalance is that it tends to increase the ripple on feedback signals such as the signals for producing compensation for the IR drop through the armature.

Attempts have been made, in accordance with the teachings of the prior art, to suppress the unbalance by selecting the thyratrons so that their operation is substantially balanced, but the selection of balanced thyratrons aside from being costly, is to a large extent ineffective, since the causes of unbalance are so multitudinous and complex that the determination of a criterion of balance is not feasible. The following list presents some of the causes of unbalance uncovered by a thorough study of this problem.

1. Ripple on the direct current components of the control potentials on the thyratrons.
2. Variations in amplitude of the phase displace alternating current components of this control potential.
3. Variations in amplitude and phase position of the alternating current components of the control potentials arising from differences in the grid resistors and capacitors.
4. Differences in the average grid characteristics of the thyratrons.
5. Differences in the grid-to-cathode resistances of the thyratrons before conduction.
6. Differences arising during the course of operation from changes in the average grid characteristic of the thyratrons because of aging.
7. Differences in the grid characteristics arising during operations from changes, caused by temperature variations in the filament or the discharge in the vapor or gas in which the discharge is produced.
8. Interaction of the thyratrons with other components of the system by reason of pickup from circuit conductors.
9. Differences in the resistances and leakage reactances of the anode windings of the supply transformer for the thyratrons.
10. Distortions in the alternating current supply caused by other loads on the supply.

It is accordingly, broadly an object of this invention to provide electric discharge apparatus in which a load current is being conducted by a plurality of discharge devices in which any unbalance between the discharge devices regardless of its cause shall be suppressed.

Another object of this invention is to provide apparatus for supplying current from an alternating current source to a load such as a motor through a pair of thyratrons in which any unbalance between the thyratrons shall be suppressed.

A general object of this invention is to provide a novel power rectifier circuit.

In accordance with this invention in its broader aspects balancing potentials depended on the magnitudes of the currents conducted by each of the discharge devices of apparatus, such as a full wave rectifier, are impressed in the control circuits of the discharge devices in such manner that when the current conducted by one of the discharge devices exceeds the current conducted by the other these potentials are applied directly to reduce the current conducted by the one discharge device and increase the current conducted by the other so that the unbalance is suppressed. These balancing potentials are so derived that the detection and the correction occur in a relatively short time interval following the unbalance.

In accordance with this invention in its specific aspects, apparatus including a motor supplied from an alternating current source through thyratrons connected in a full wave rectifier circuit is provided in which potentials depend on the current conducted by each of the thyratrons are impressed in the control circuits of the thyratrons in such a manner as to suppress any unbalance.

The novel features considered characteristic of this invention are discussed generally above. The invention itself, both as to its organization and its method of operation together with additional objects and advantages thereof, will be understood from the following description of a specific embodiment when read in connection with the accompanying drawings, in which:

Fig. 2 is a schematic diagram giving magnitudes of components of apparatus as shown in Fig. 1 which has been made and found to be satisfactorily operative.

Figure 1:
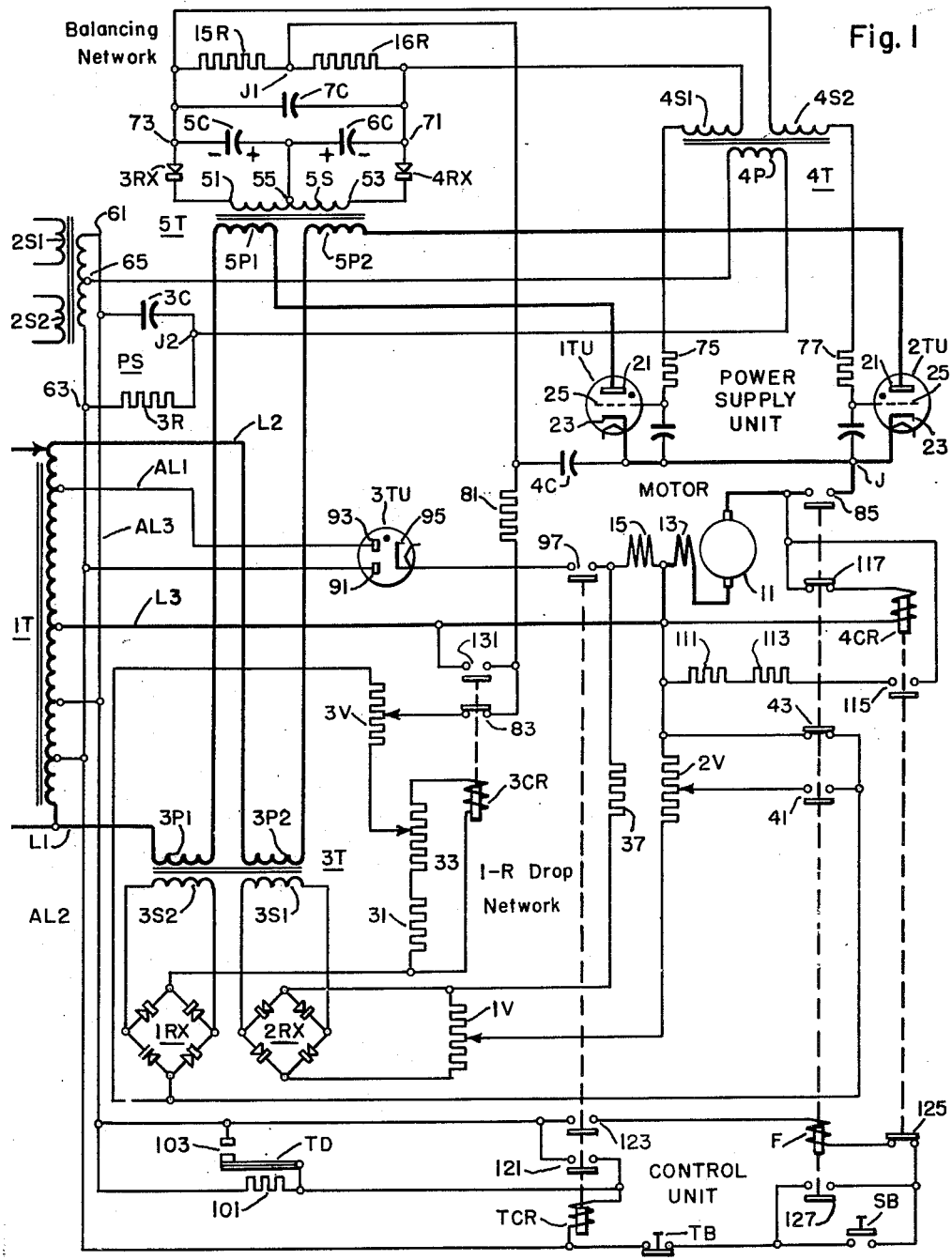
Figure 1 is a circuit diagram of a preferred embodiment of this invention.

Fig. 2 is presented to aid those skilled in the art in practicing this invention and should not be taken to limit the scope of the invention. Those skilled in the art can on the basis of the teachings of this application select components differing both as to magnitude and kind from those shown in Fig. 2 without departing from the scope of this invention and this invention is not intended to be limited to the components and magnitudes given in Fig. 2.

DESCRIPTION

The apparatus shown in Fig. 1 and Fig. 2 includes a motor, a power supply unit and a control unit. The principal components of this apparatus are supplied from conductors L1, L2, and L3, which derive their power from an autotransformer 1T. The conductor L3 is connected to be at a potential intermediate the potentials of conductors L1 and L2. The auxiliary components of the apparatus are energized from conductors AL1, AL2 and AL3 which are also supplied from the autotransformer 1T. The transformer 1T may be energized from the usual commercial supply.

The motor includes an armature 11, a series field winding 13, and a shunt field winding 15. In the usual practice of this invention, the motor is of the type capable of driving a heavy load; for example, this invention has been used with a 5 horsepower motor.

The power supply unit includes a pair of thyratrons 1TU and 2TU, a rectifier 3TU, and IR drop network which cooperates for the drop across the armature and a balancing network. Each thyratron 1TU and 2TU has an anode 21, a cathode 23, and a grid 25. The IR drop network includes a transformer 3T having a pair of primaries 3P1 and 3P2 and a pair of secondaries 3S1 and 3S2. The secondary 3S1 is connected through a rectifier 2RX to supply direct current to a voltage divider 1V. The divider 1V is connected across the shunt field winding 15 through divider 2V and a fixed resistor 37. The secondary 3S2 is connected through a rectifier 1RX to supply a network consisting of a resistor 31, a variable resistor 33, and a voltage divider 3V. The resistors 31 and 33 are shunted by the coil of a relay 3CR which may be actuated when the current flow through these components exceeds a predetermined limit. The adjustable arm of the divider 2V is adapted to be connected to the next negative terminal of the divider 3V through normally open contacts 4 of a relay F in the control unit. The divider 2V may also be shunted out through normally closed contacts 43 of relay F.

The balancing network includes a transformer 5T having a pair of primaries 5T1 and 5T2 and a secondary 5S which has a pair of end terminals 51 and 53 and an intermediate terminal 55. The section of the secondary 5S defined by the end terminal 51 and an intermediate terminal 55 is connected in series with a rectifier 3RX and a capacitor 5C. The rectifier 3RX is so poled as to conduct positive current from the capacitor 5C to the secondary 5S. By positive current, the flow of ions or holes as distinct from electrons is meant. The other section 53—55 of the secondary 5S is connected in series with another rectifier 4RX and another capacitor 6C, the rectifier 4RX being poled to conduct positive current from the capacitor 6C to the section of the secondary 5S. The capacitors 5C and 6C are shunted by another capacitor 7C of substantially greater magnitude than either of the capacitors 5C and 6C and also by a pair of resistors 15R and 16T of equal magnitude.

The anode 21 of thyratron 1TU is connected to the conductor L1 through the primaries 3P1 and 5P1. The anode of thyratron 2TU is connected to the conductor L2 through the primaries 3P2 and 5P2. The primaries 5P1 and 5P2 are so connected that a potential of one polarity is induced in secondary 5S when thyratron 1TU is conducting and a potential of the opposite polarity is induced in secondary 5S when thyraton 2TU is conducting. For the potential of the first polarity, capacitor 5C is charged and for the potential of the second polarity, capacitor 6C is charged.

The cathodes of thyratrons 1TU and 2TU are connected together to a common junction J. Junction J is adapted to be connected to the conductor AL3 through a normally open contact 51 of the relay F in the control unit, the armature 11 of the motor and the series field winding 13 of the motor. The thyratrons 1TU and 2TU are thus connected in a full-wave rectifying circuit with the conductors L1, L2, and L3 to supply the motor.

The power supply unit also includes a phase shift network PS. This network includes a winding 2P of a transformer 2T, which supplies filament current to the discharge devices 1TU, 2TU, 3TU, a capacitor 3C, a resistor 3R, and the primary 4P of a transformer having two secondaries 4S1 and 4S2. The winding 2P has end terminals 61 and 63, and an intermediate terminal 65. The end terminals 61 and 63 are connected in series with the capacitor 3C and the resistor 3R. The primary 4P is connected between the intermediate terminal 65 and the junction J2 of the capacitor 3C and the resistor 3R. The potential which appears between terminal 65 and junction J2 is displaced in phase with reference to the potentials between L1 and L3 and L2 and L3 by an angle, preferably a lagging angle of the order of 90°.

The balancing network has two terminals 71 and 73 at the negative plates of the capacitors 5C and 6C. One of these terminals is connected to the grid 25 of thyratron 1TU through the secondary 4S1 and a grid resistor 75. The other terminal 73 is connected to the grid 25 of the thyratron 2TU through the secondary 4S2 and another grid resistor 77. The control circuits for the two thyratrons is adapted to be completed from the junction J1 through a resistor 81, a normally closed contact 83 of the overcurrent relay 3CR, the voltage divider 3V supplied from the rectifier 1RX, the normally open contact 41 of the relay F, the voltage divider 2V supplied from the voltage divider 1V, the series field winding 13, the armature 11, and a normally open contact 85 of relay F to the junction J. The junctions J1 and J are interconnected by capacitor 4C which filters out abrupt variations in the signal supplied by the armature 11 and field winding 13 of the motor and the voltage dividers 3V and 2V.

It is seen that between the grid and the cathode of thyratron 1TU, potential from the following power supply components is in effect adapted to be impressed, the secondary 4S1, the capacitor 6C, the divider 3V, the divider 2V, the field winding 13 and armature 11 of the motor. The secondary 4S1 provides an alternating potential of relatively small magnitude displaced in phase with reference to the potential impressed by the conductors L1 and L3. The capacitor 5C impresses a potential tending to decrease the current flow through the thyratron 1TU. This potential is built up during the intervals when thyratron 1TU conducts and is the greater current conducted by the thyratron 1TU. The tendency of this potential then, is to suppress any increase in current flow through the thyratron 1TU. The armature of the motor supplies two potentials, the counter-E. M. F. and the IR drop. Both potentials are of such polarity as to tend to decrease the conductivity of the thyratron 1TU. The voltage dividers 3V and 2V each supply potentials tending to increase the conductivity of the thyratron 1TU. These potentials increase as the current conducted by the thyratron increases, that is, in effect, as the IR drop across the motor increases. They, thus, tend to counteract the IR drop of the motor. The speed of the motor is set by divider 2V and the minimum speed compensation is set by divider 3V. The compensation is limited by the setting of divider IV.

The control circuit of thyratron 2TU is similar except that it includes capacitor 5C and secondary 4S2. Secondary 4S2 is connected so as to impress a small alternating potential in the control circuit of thyratron 2TU which balances the potential impressed by secondary 4S1 in the control circuit of thyratron 1TU.

The discharge device 3TU is a double diode of the gaseous type having a pair of anodes 91 and 93 and a cathode 95. The cathode 95 is connected to conductor L3 through a contact 97 of the relay TCR and the shunt field winding 15 of the motor. One of the anodes 91 is connected to the conductor AL1 and the other to conductor AL2. The shunt field winding is thus supplied with direct current through thyratron 3TU.

The control unit includes, in addition to the relays F and TCR, a relay 4CR and a thermal delay element TD having a heater 101 and a contact 103. The control unit also includes a start push button SB and a stop push button TB. The control unit also includes braking resistors 111 and 113 adapted to be connected across the armature 11 and series field winding 13 of the motor through a normally open contact 115 of the relay 4CR.

The coil of the relay 4CR is connected across the armature 11 and series field winding 13 of the motor through a normally closed contact 117 of relay F. The coil of relay TCR is connected between the conductors AL2 and AL3 through the heater 101 of the thermal device TD and alternatively through the contact 113 of this thermal device. The coil of TCR is also adapted to be connected between the conductors AL2 and AL3 through one of its normal contacts 121 which locks out the terminal device TD. The coil of relay F is adapted to be connected between the conductors AL2 and AL3 through a normally open contact 123 of relay 2TR, a normally closed contact 125 of relay 4CR, the start push button SB, and the stop push button TB. The start push button may be locked out by a normally open contact 127 by relay F.

*Standby*

In the standby condition of the apparatus, power is supplied to the autotransformer 1T and the conductors L1, L2, L3, AL1, AL2 and AL3 are energized. The cathodes of the thyratrons 1TU and 2TU and of the discharge device 3TU are then heated. When the power is first applied, the contact 103 of thermal element TD is open but current is supplied to the heater 101 of the thermal element through the coil of relay TCR. This current is insufficient to actuate relay TCR, but is sufficient to heat the heater 101. When the heater has been heated for a time interval sufficient to enable the cathodes to each an adequate temperature, the contact 103 of the thermal element closes and relay TCR is actuated and locks itself in through its normally open contact 121. The power is now available at the terminal of the start button through the now closed contact 123 of relay TCR and normally closed contact 125 of relay 4CR. In addition, another normally open contact 97 of relay TCR closes and power is supplied to the shunt field 13. At this time the control circuits of thyratrons 1TU and 2TU are connected through the normally closed contact 117 of relay F to conductor L3 and divider 2V is shunted out. The conduction of thyratrons 1TU and 2TU then corresponds to the setting of divider 3V which is set for zero speed.

*Operation*

To operate the apparatus the start button SB is closed, energizing relay F. When relay F is actuated, its normally open contact 85 in series with the armature is closed connecting the armature to the junction J. The normally closed contact 117 in series with the coil of 4CR is opened disconnecting the coil from the armature. The normally closed contact 43, shunting out the divider 2V, is opened and the normally open contact 41, in series with divider 2V, is now connected in the control circuits of the thyratrons 1TU and 2TU. The thyratrons are then initially energized at instants in the periods of the supply L1, L2, and L3 corresponding to the drop across the series field 13 and the phase setting of the potentials from secondaries 4S1 and 4S2. The armature 11 of the motor then starts to rotate introducing back E. M. F. and potential arising from the IR drop in the control circuits of the thyratrons 1TU and 2TU. The IR drop potential is compensated by the potential impressed across the divider 2V from the rectifier 2RX. The conduction of the thyratrons 1TU and 2TU then continues to change until the current conducted corresponds to the setting of the divider 2V. At this point the operation of the motor is at a predetermined speed.

The current flow through the thyratrons 1TU and 2TU in addition to introducing the IR drop compensation potential through transformer 3T also introduces a potential through transformer 5T which results in the charge of the capacitors 5C and 6C to potentials depending on the current flow through the thyratrons 1TU and 2TU respectively. If the current conducted by one of the thyratrons, say, 1TU exceeds the current conducted by the other thyratron 2TU, the negative potential impressed on capacitor 6C will exceed the negative potential impressed on capacitor 5C. Under such circumstances, there will be a net potential across capacitor 7C tending to decrease the current conducted by thyratron 1TU and increase the current conducted by thyratron 2TU until the currents are balanced. The converse occurs when the current conducted by thyratron 2TU exceeds the current conducted by thyratron 1TU. Thus, the thyratrons 1TU and 2TU are maintained balanced regardless of the fact that they may have different characteristics initially or different characteristics because they age or regardless of the fact that the components in the circuits of each of the thyratrons may be initially different or may change by ageing.

In the event that the current conducted through the motor exceeds a safe limit, relay 3CR is actuated opening its normally closed contact 83 in series with divider 3V and closing its normally open contact 131 which shunts out dividers 3V and 2V. A high blocking potential is now impressed in the control circuits of thyratrons 1TU and 2TU and they become non-conducting until the armature current decreases to a proper magnitude.

When it is desired to stop the motor, the stop button TB may be opened. Under such circumstances, relay F is deenergized opening its normally open contact 41 and closing its normally closed contact 43. The potential across the armature and the field winding is now impressed across the coil of relay 4CR. The normally open contact 115 of relay 4CR is now closed connecting the braking resistors 111 and 113 across the armature 11 so that its rotation is stopped. In addition, a normally closed contact 125 in series with the start and stop button SB and TB is opened to assure that the relay F remains deenergized as the motor is coasting to a stop.

CONCLUSION

The effectiveness of the disclosed apparatus to a great extent arises from the current forcing action of current transformer 5T. As long as the rated voltages of 5T are not exceeded, the ratio of secondary current to primary current will remain essentially constant in spite of changes in the load impedance of the secondary winding 55. By providing capacitors in the circuit an integrating or cumulative action is obtained and a small unbalance can eventually generate a substantial correcting signal.

It will be noticed that for the apparatus shown there would be a tendency for the D.-C. voltages across capacitors 5C and 6C to build up to very high voltages depending upon the back leakage of rectifiers 3RX and 4RX and the saturation voltage for transformer 5T. In some cases it would probably be necessary to parallel or replace capacitors 5C and 6C with resistors to limit these individual voltages to a safe magnitude.

Since most thyratrons (1TU, 2TU) have enough thermal capacity to permit moderate overload currents for several seconds, the response delay introduced by larger magnitudes of capacitance for capacitor 7C will not be objectionable.

The circuit can also be used to indicate the loss of a thyratron during operation. If the swing of the thyratron control voltage is limited sufficiently the balancing network would limit the current in the remaining thyratron to a low magnitude and the operator would note the absence of glow so preventing damage to the thyratron still conducting.

If it is desirable to continue operating during a thyratron failure, a circuit could be arranged which would detect any appreciable voltage appearing across capacitor 7C and then operate a warning light or bell. The operator could then replace the defective thyratron before the remaining thyratron was damaged from carrying the total load.

When used with an A.-C., D.-C. grid system the balancer would permit the use of smaller A.-C. grid voltages and so increase the system gain.

The above discussed motor control circuit is seen to include highly effective facilities for balancing the conduction of the power discharge devices which supply the armature of the motor. While the invention in its specific aspects is thus intimately tied up with a motor in its broader aspects, the invention may be applied to a power rectifier supplying a load of any type. Accordingly, while a preferred embodiment of the invention has been described herein, many modifications thereof are feasible. The invention, therefore, is not to be restricted and may be effected insofar as is necessitated by the spirit of the prior art.

I claim as my invention:

1. Apparatus for controlling the supply of current to a motor having an armature from first, second and third supply conductors, said third conductor being at a potential intermediate said first and second conductors, comprising in combination, a first thyratron, a second thyratron, each of said thyratrons having an anode, a cathode and a control electrode, first inductive means having input winding means and output winding means, second inductive means having input winding means and output winding means, means for connecting in series said first terminal, said third terminal, said armature, said input winding means of said first inductive means, and said anode and cathode of said first thyratron, means for connecting in series said second terminal, said third terminal, said armature, said input winding means of said second inductive means and said anode and cathode of said second device, first impedance means, second impedance means, asymmetric conducting means connecting said first impedance means in circuit with said output winding means of said first inductive means so that a potential is impressed across said first impedance means when current flows through said input winding means of said first inductive means, asymmetric conductive means connecting said second impedance means in circuit with said output winding means of said second inductive means so that a potential is impressed in said second impedance means when current flows through said input winding means of said second inductive means, means connecting said first and second impedance means in opposing relationship between said control electrodes, and means for connecting the electrical center of said impedance means to said cathodes.

2. Apparatus for supplying power to a load from an alternating current source including a pair of electric discharge devices connected in a full-wave rectifier circuit between said source and said load, each of said devices having a control electrode, including means connected to one of said devices for deriving a first potential dependent on the current through said one device, means connected to the other of said devices for deriving a second potential dependent on the current through said other device, and means impressing said potentials between said control electrodes in opposing relationship so that when the current through one of said devices exceeds the current through the other said potentials tend to effect a decrease in the current through said one device and an increase in the current through said other device.

3. In combination a motor having an armature, first, second, and third conductors for supplying alternating current, said third conductor being adapted to be at a potential intermediate said first and second conductors, a first thyratron having an anode, a cathode, and a control electrode, a second thyratron having an anode, a cathode, and a control electrode, transformer means having a first winding, a second winding and secondary winding means, said secondary winding means having first and second electrical end terminals and an electrical intermediate terminal, means connecting said cathode together so that they have a common junction, means including said first winding connecting said anode of said first thyratron to said first conductor, means including said second winding connecting said anode of said second thyratron to said second terminal, means including said armature connecting said common junction to said third terminal, means for producing an alternating potential dephased with respect to said alternating current, a first capacitor, a second capacitor, a first rectifier, a second rectifier, means including said first rectifier connecting said first capacitor between said first and said intermediate terminals, means including said second rectifier connecting said second capacitor between said second and said intermediate terminals, said rectifiers being connected to block current between said first and said second terminals and each of said rectifiers being connected to conduct positive current from the capacitor to its associated terminal, means including said alternating potential for connecting said capacitors between said control electrodes, and means for connecting the electrical center between said capacitors to said second conductor, said first and second windings and said secondary winding means being so connected that the flow of current through said first thyratron produces a potential of one polarity across said secondary winding means and the flow of current through said second thyratron produces a potential of the opposite polarity across said secondary winding means, and said alternating potential being impressed in balanced relationship in circuit with each of said control electrodes.

4. In combination a motor having an armature, first, second, and third conductors for supplying alternating current, said third conductor being adapted to be at a potential intermediate said first and second conductors, a first thyratron having an anode, a cathode, and a control electrode, a second thyratron having an anode, a cathode and a control electrode, a first electric discharge device, a second electric discharge device, each of said devices having a first principal electrode, a second principal electrode, and a control electrode, transformer means having a first winding, a second winding and secondary winding means, said secondary winding means having first and second electrical end terminals and an electrical intermediate terminal, means connecting said second principal electrodes together so that they have a common junction, means including said first winding connecting said first principal electrode of said first device to said first conductor, means including said second winding connecting said first principal electrode of said second device to said second terminal, means including said armature connecting said common junction to said third terminal, means for producing an alternating potential dephased with respect to said alternating current, a first capacitor, a second capacitor, a first rectifier, a second rectifier, means including said first rectifier connecting said first capacitor between said first and said intermediate terminals, means including said second rectifiers connecting said second capacitor between said second and said intermediate terminals said rectifiers being connected to block current between said first and said second terminals and each of said rectifiers being connected to conduct positive current from the capacitor to its associated terminal, means including said alternating potential for connecting said capacitors between said control electrodes, and means for connecting the electrical center between said capacitors to said second conductor, said first and second windings and said secondary winding means being so connected that the flow of current through said first thyratron impresses a potential of one polarity across said secondary winding means and the flow of current through said second thyratron impresses a potential of the opposite polarity across said secondary winding means, and said alternating potential being impressed in balanced relationship in circuit with each of said control electrodes.

5. In combination a motor having an armature, first, second and third conductors for supplying alternating current, said third conductor being adapted to be at a potential intermediate said first and second conductors, a first thyratron having an anode, a cathode, and a control electrode, a second thyratron having an anode, a cathode and a control electrode, a first electric discharge device, a second electric discharge device, each of said devices having a first principal electrode, a second principal electrode, and a control electrode, transformer means having a first winding, a second winding and secondary winding means, said secondary winding means having first and second electrical end terminals and an electrical intermediate terminal, means connecting said second principal electrodes together so that they have a common junction, means including said first winding connecting said first principal electrode of said first device to said first conductor, means including said second winding connecting said first principal electrode of said second device to said second terminal, means including said armature connecting said common junction to said third terminal, means for producing an alternating potential dephased with respect to said alternating current, a first capacitor, a second capacitor, a first rectifier, a second rectifier, means including said first rectifier connecting said first capacitor between said first and said intermediate terminals, means including said second rectifiers connecting said second capacitor between said second and said intermediate terminals, said rectifiers being connected to block current between said first and said second terminals and each of said rectifiers being connected to conduct positive current from the capacitor to its associated terminal, and said capacitors being connected with the potentials on them opposing, a third capacitor of substantially greater capacity than said first and second capacitors connected in parallel with said first and second capacitors, means including said alternating potential for connecting said capacitors between said control electrodes, and means for connecting the electrical center between said capacitors to said second conductor, said first and second windings and said secondary winding means being so connected that the flow of current through said first thyratron impresses a potential of one polarity across said secondary winding means and the flow of current through said second thyratron impresses a potential of the opposite polarity across said secondary winding means, and said alternating potential being impressed in balanced relationship in circuit with each of said control electrodes.

6. In combination a motor having an armature, first, second and third conductors for supplying alternating current, said third conductor being adapted to be at a potential intermediate said first and second conductors, a first thyratron having an anode, a cathode and a control electrode, a second thyratron having an anode, a cathode and a control electrode, a first electric discharge device, a second electric discharge device, each of said devices having a first principal electrode, a second principal electrode, and a control electrode, transformer means having a first winding, a second winding and secondary winding means, said secondary winding means having first and second electrical end terminals and an electrical intermediate terminal, means connecting said second principal electrodes together so that they have a common junction, means including said first winding connecting said first principal electrode of said first device to said first conductor, means including said second winding connecting said first principal electrode of said second device to said second terminal, means including said armature connecting said common junction to said third terminal, means for producing an alternating potential dephased with respect to said alternating current, a first capacitor, a second capacitor, a first rectifier, a second rectifier, means including said first rectifier connecting said first capacitor between said first and said intermediate terminals, means including said second rectifiers connecting said second capacitor between said second and said intermediate terminals, said rectifiers being connected to block current between said first and said second terminals and each of said rectifiers being connected to conduct positive current from the capacitor to its associated terminal, a pair of resistors connected in parallel with said capacitors, said resistor defining the electrical center between said capacitors at their junction, means including said alternating potential for connecting said capacitors between said control electrodes, and means for connecting the electrical center between said capacitors to said second conductor, said first and second windings and said secondary winding means being so connected that the flow of current through said first thyratron impresses a potential of one polarity across said secondary winding means and the flow of current through said second thyratron impresses a potential of the opposite polarity across said secondary winding means, and said alternating potential being impressed in balanced relationship in circuit with each of said control electrodes.

References Cited in the file of this patent

UNITED STATES PATENTS 2,151,753   Etzrodt _____ Mar. 21, 1939